United States Patent [19]

Kosaka et al.

[11] Patent Number: 4,703,367
[45] Date of Patent: Oct. 27, 1987

[54] RECORDING DISK DATA PLAYBACK APPARATUS

[75] Inventors: Minoru Kosaka; Tutomu Banno, both of Tokorozawa, Japan

[73] Assignee: Pioneer Electronic Corporation, Tokyo, Japan

[21] Appl. No.: 776,706

[22] Filed: Sep. 16, 1985

[30] Foreign Application Priority Data

Sep. 14, 1984 [JP] Japan .................................. 59-193706
Sep. 14, 1984 [JP] Japan .................................. 59-193709

[51] Int. Cl.⁴ .............................................. H04N 5/76
[52] U.S. Cl. ..................................... 358/339; 358/343
[58] Field of Search ............... 358/342, 337, 338, 339, 358/343; 369/32, 59, 49, 50, 2

[56] References Cited

U.S. PATENT DOCUMENTS 4,481,615 11/1984 Hioki .................................. 358/342
4,535,366 8/1985 Pullen .................................. 358/342

Primary Examiner—Donald McElheny, Jr.
Attorney, Agent, or Firm—Banner, Birch, McKie & Beckett

[57] ABSTRACT

A recording disk data playback apparatus capable of playback of recording disks having a video signal usually with an audio signal recorded thereon by frequency modulation, together with audio data modulated as a pulse train superimposed thereon, includes a phase-lock loop circuit for generating a read-out clock signal to read out from a memory the playback digital audio data, in which that data has been temporarily stored, with the loop circuit including a filter whose cut-off frequency is selected to be lower than the maximum frequency of the bandwidth of a tangential servo system which controls movement of a data sensing light spot tangential to the recording tracks. Jitter which cannot be fully corrected by the tangential servo system is thereby eliminated.

2 Claims, 7 Drawing Figures

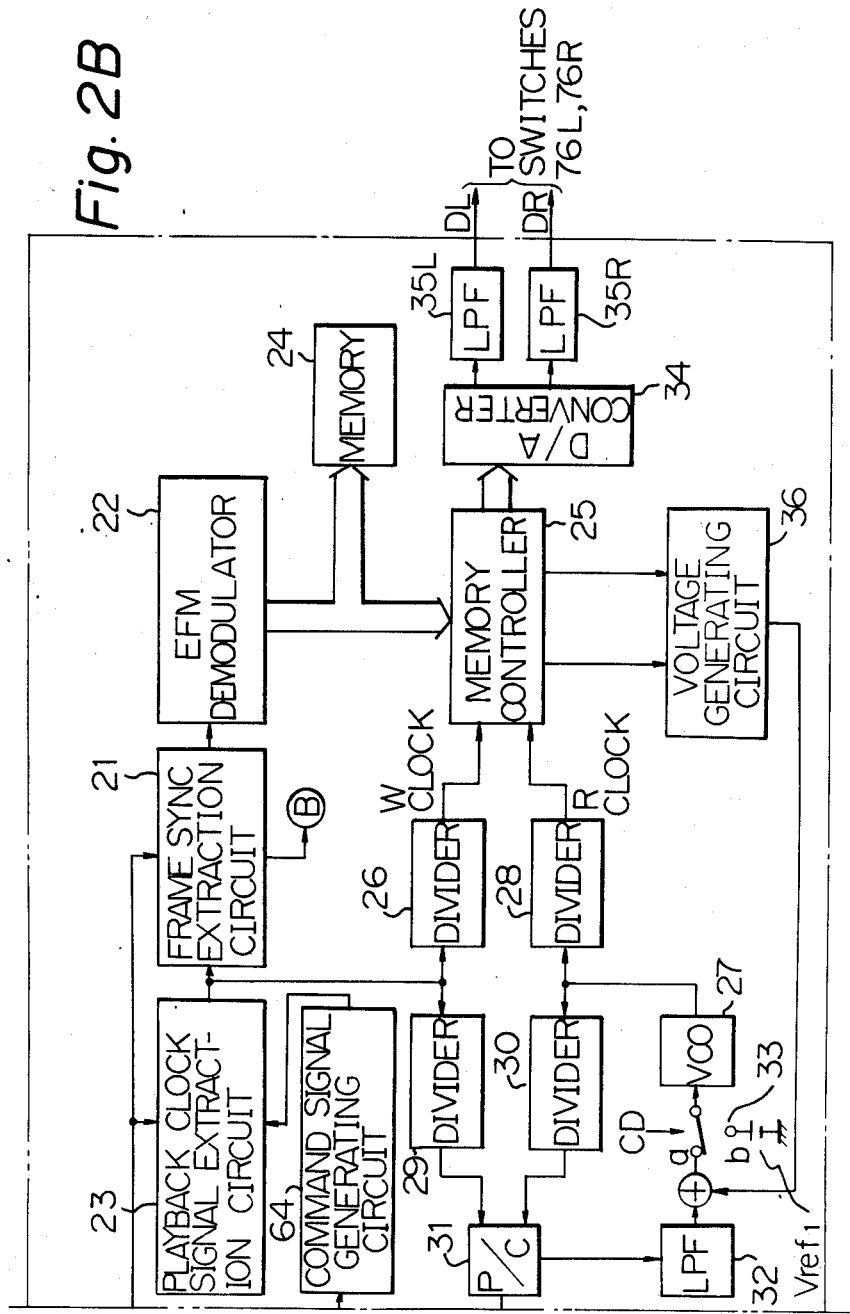

RECORDING DISK DATA PLAYBACK APPARATUS

BACKGROUND OF THE INVENTION

The present invention relates to a recording disk data playback apparatus having a capability for playback of both analog and digital recorded data from recording disks, and in particular to a recording disk data playback apparatus which is capable of playback of type of recording disk having a video signal usually with an audio signal recorded thereon by frequency modulation, together with audio data which has been digitized and converted to a pulse train which is superimposed on the frequency modulation signals, with the apparatus being capable of producing output audio signals which are significantly more free from time axis deviations, i.e. jitter, than has been possible in the prior art.

Various types of recording disk data playback apparatus, sometimes referred to as disk players, have been developed. Until recently, such players were divided into two basic types. One type is utilized only for playback of video disks on which a video signal usually with an audio signal is recorded in the form of analog signals. Such disks are sometimes referred to as LDs, and this abbreviation will be used for these in the following. With such disks, the video and analog signals are utilized to frequency-modulate a high-frequency carrier signal, and the resultant modulated signal is recorded on the disk. The other type of disk player is utilized for playback of digital audio disks, sometimes referred to as compact disks or CDs, and the latter abbreviation will be used hereinafter for such disks. CDs have audio data recorded thereon in the form of a digital signal of PCM (pulse-code modulation) type, i.e. a carrier signal is modulated by an encoded digital signal representing the audio data, and the modulated signal is recorded on the disk. However in recent years, a new type of recording disk (designated in the following as LDD) has been developed, as described in Japanese patent 58-45780 whereby an audio signal which has been digitized, e.g. by a method such as PCM, is converted into a pulse train of form suitable for disk recording, e.g. by applying the EFM (eight-to-fourteen) technique, and this pulse train signal is then superimposed upon a signal which has been produced by FM modulation of a high-frequency carrier by a video signal usually with an audio signal. The signal which results from this superimposition of the pulse train signal upon the modulated carrier is recorded on the disk. With the latter method, the audio signal is generally separated into two channels, e.g. corresponding to the stereophonic right and left channels, with 2.3 MHz and 2.8 MHz audio carriers being respectively frequency modulated by the two audio channel signals. The frequency spectrum of the recorded signal is such that the the sync tip portions of the video signal correspond to a frequency of 7.6 MHz, the pedestal level to 8.1 MHz, and the white peak level to 9.3 MHz. If the EFM technique is used to record the audio digital signal, then the frequency spectrum of the pulse train will extend from 3T to 11T, where T is the bit period of the PCM signal, 3T corresponds to a pulse frequency of approximately 720 KHz, and 11T is the maximum pulse width and corresponds to a frequency of approximately 200 KHz. This pulse train signal is superimposed on the main video carrier at a level which is approximately 1/10 off the carrier level, or less. Amplification and slicing close to the zero-crossing points are then performed to produce a pulse-width modulated signal, which is used as the recording signal.

With video and audio signals recorded on a disk by the method described above, the frequency spectrum of the RF signal which is produced from the disk will be as shown in FIG. 1. Here, A denotes the digitized audio signal component, B denotes the audio FM signal component, C denotes the color information component of the video FM signal component, and D denotes the brightness component of the video FM signal component.

A very wide dynamic range, e.g. 90 dB or higher is provided by a digitized audio signal with such a system. Thus, a substantial improvement in acoustic fidelity can be attained, by comparison with recording and playback of audio signals using frequency modulation.

A digital demodulator system for demodulation of a digital signal containing audio data, such as that produced by playback of a digital audio disk, generally incorporates a memory, into which digital data is temporarily stored and then read out, to eliminate the effects of time-axis deviations, e.g. jitter. Prior to being subjected to digital/analog conversion, the digital signal containing the audio data is temporarily written into this memory, with the write-in operation being performed in synchronism with a write-in clock signal of specific frequency. Shortly thereafter, the stored digital data is read out of the memory, in synchronism with a read-out clock signal. This procedure serves to reduce time-axis deviations in the output audio signal after demodulation.

In a recording disk data playback apparatus according to the present invention, a tangential servo loop is also incorporated, which functions during playing of CDs, LDDs and LDs such as to eliminate, as far as possible, time axis deviations (i.e. jitter components) in the playback signal which is reproduced from the disk. This tangential servo loop serves to control movement of a data-sensing light spot along a direction tangential to a disk track. However since this servo loop includes mechanical components such as an actuator, it cannot respond with a sufficient degree of rapidity and accuracy to completely eliminate all jitter components. In addition, due to the fact that due to mechanical tolerances there will be some degree of eccentricity in the rotation of a disk on the apparatus, i.e. disk wobble, a periodic frequency component in the playback will be produced as a result, and this will therefore also add a jitter component to the output audio signal from the apparatus.

SUMMARY OF THE INVENTION

It is an objective of the present invention to provide a recording disk data playback apparatus which will produce a digital signal that is completely free from jitter, by suppressing jitter components contained in the playback digital signal, both during playback of CDs and playback of LDDs.

A recording disk data playback apparatus according to the present invention comprises demodulator means for demodulating a playback digital signal, write-in means for writing the demodulated output from the demodulator means into a memory in synchronization with a playback clock signal which is contained in the playback digital signal, and a read-out clock signal generating circuit for generating a read-out clock signal in synchronism with the playback clock signal, the read-out clock signal being utilized to read out data stored in the memory, the apparatus being characterized in that the read-out clock signal generating circuit consists of a phase-lock loop circuit which includes a loop filter for bandwidth limitation connected therein, with the cut-off frequency of the loop filter being lower than the minimum frequency of the bandwidth of a servo loop which implements position control of a data read-out light spot with respect to movement across the surface of the recording disk along a direction which is tangential to a disk track. In addition, the cut-off frequency of the loop filter is preferably made lower than the minimum frequency of an eccentric wobble component contained in the playback signal, resulting from eccentric rotation of a recording disk.

BRIEF DESCRIPTION OF THE DRAWINGS

FIGS. 2a, 2b, 2c, and 2d are embodiment of a recording disk data playback apparatus incorporating a switching apparatus according to the present invention;

DESCRIPTION OF THE PREFERRED EMBODIMENTS

Figure 2A:
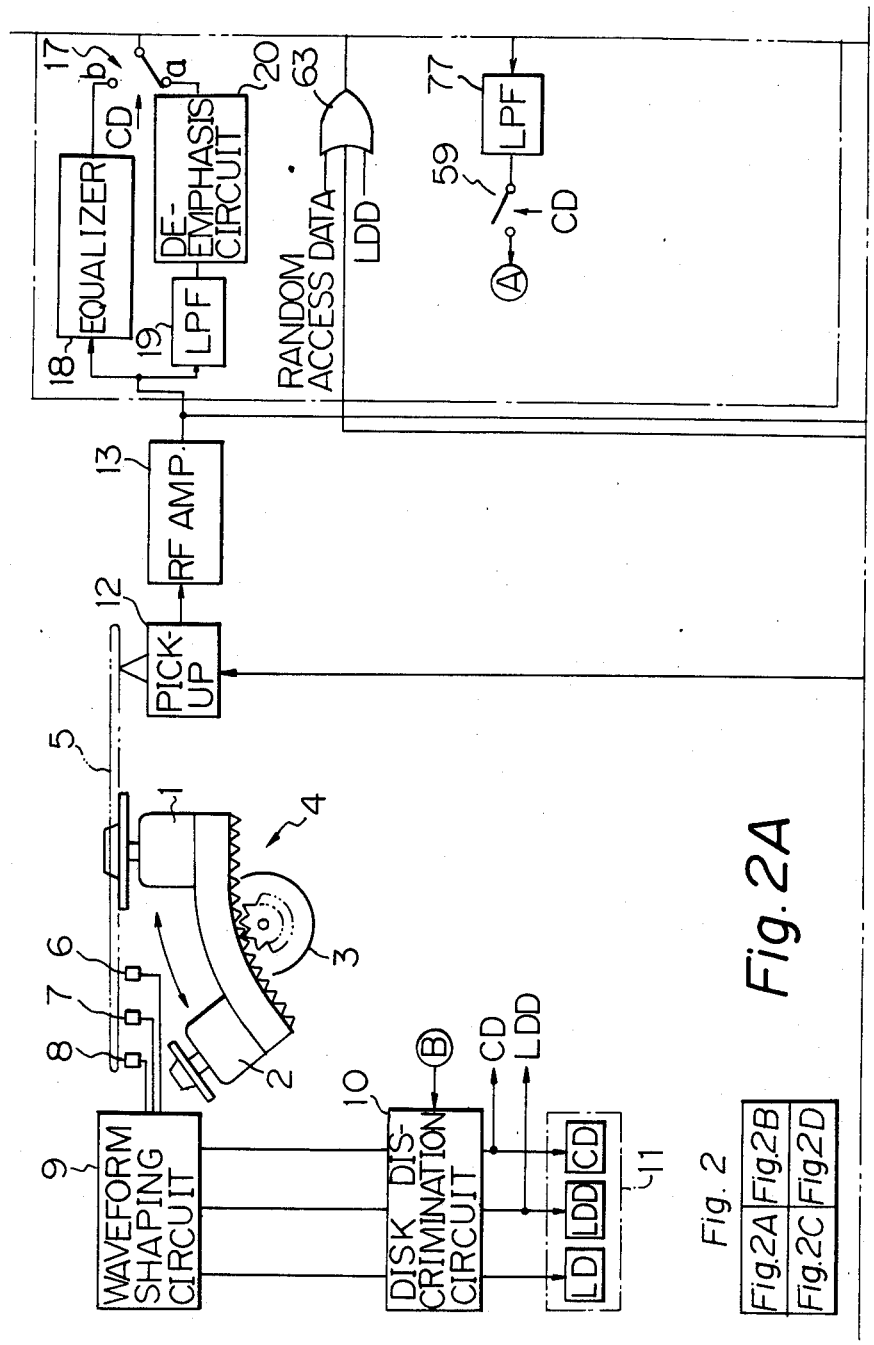
Figure 2C:
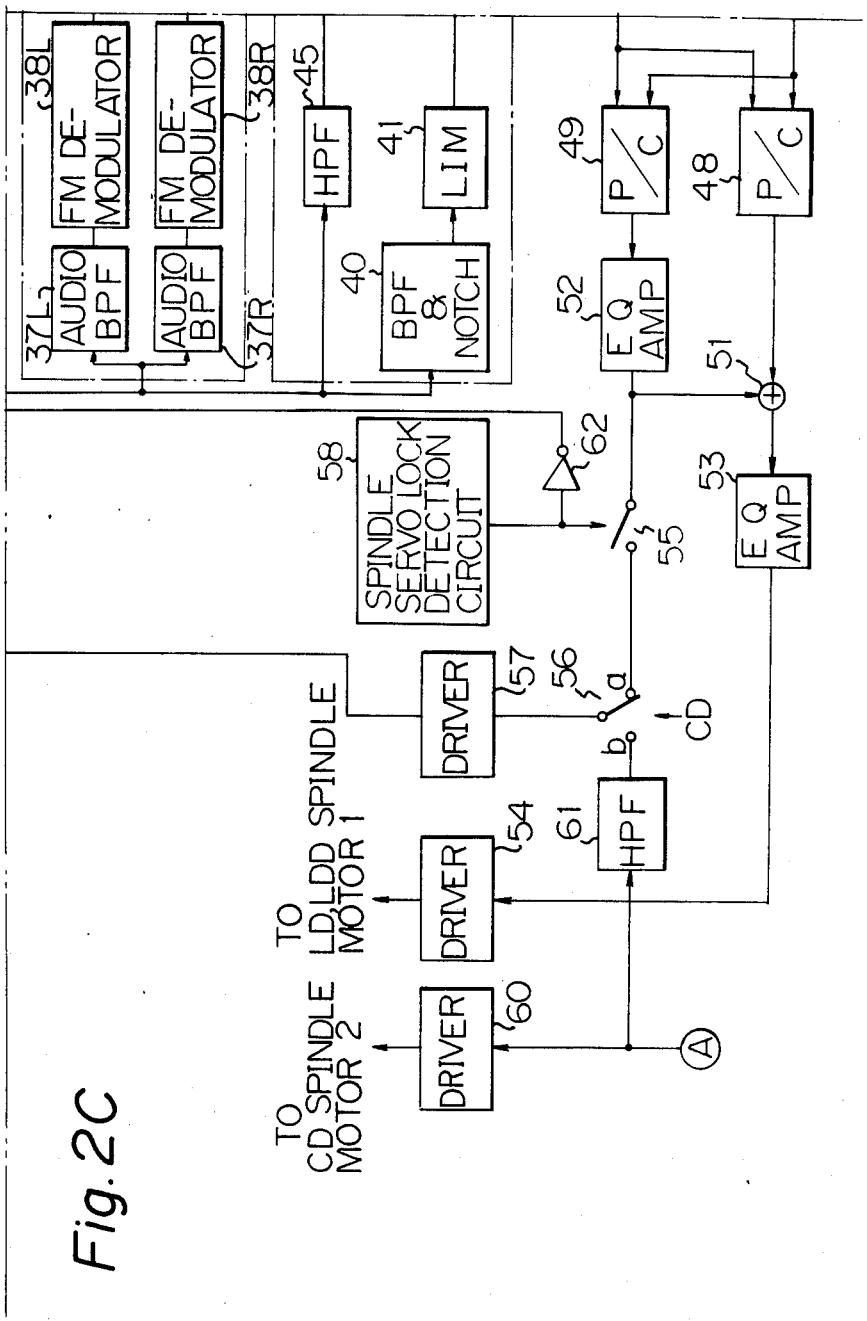
Figure 2D:
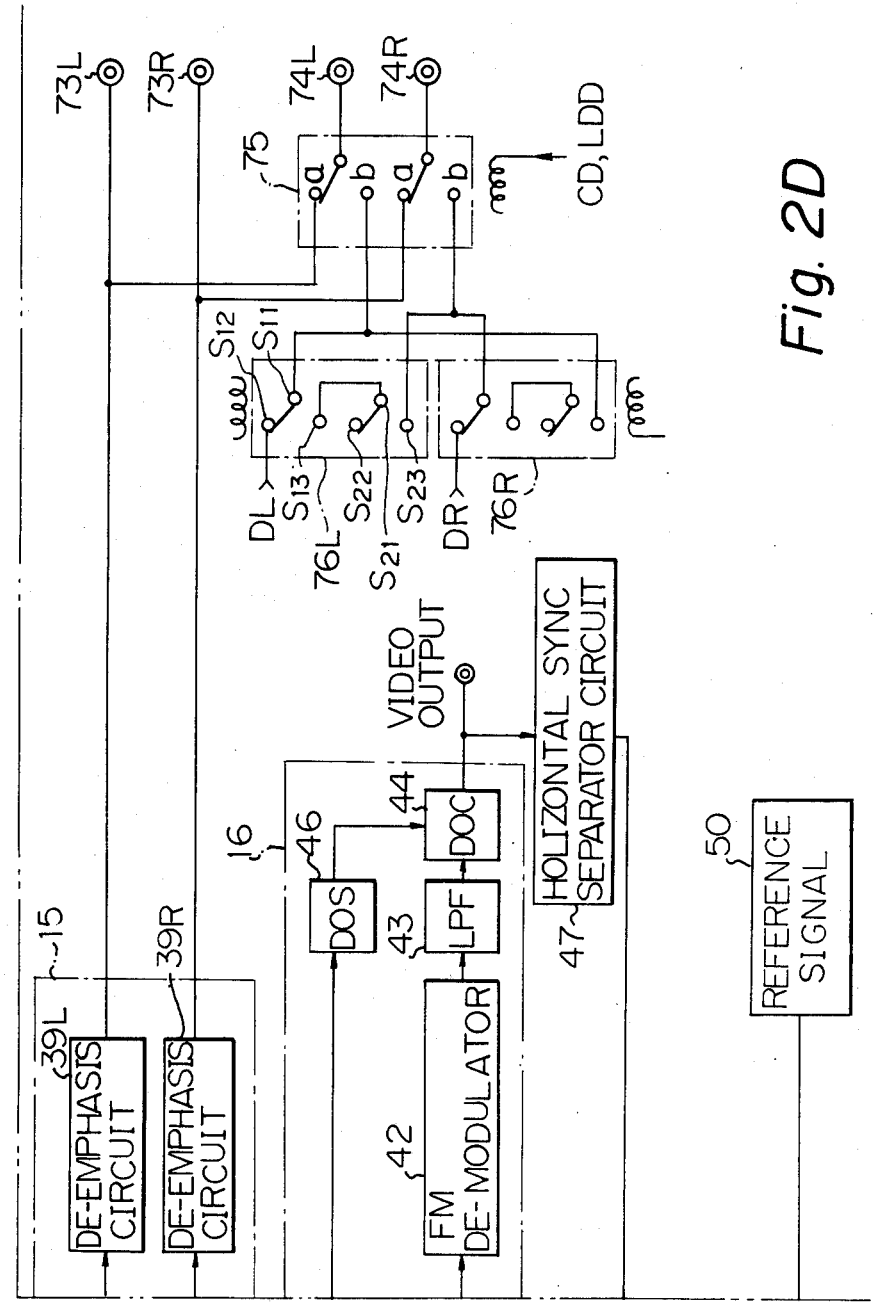

Embodiments of the invention will now be described in detail, referring to the drawings. FIG. 2 is a block diagram of an embodiment of a recording disk data playback apparatus according to the present invention. This type of apparatus is sometimes referred to as a compatible disk player, since it can be used to play both CDs, LDDs and LDs, respectively having audio and video data recorded thereon as described hereinabove. The playback speed employed for a video disk (i.e. LD or LDD) is different from that for a digital audio disks (CD). For this reason, the disk player incorporates both a spindle motor 1 which is used to play LDs and LDDs, and a spindle motor 2 which is used to play CDs. Spindle motors 1 and 2 are respectively selected in accordance with the type of disk which is to be played, with this selection being carried out by changeover means, which in this embodiment consist of a changeover mechanism 4, which employs a motor 3 as a drive source.

Three sensors designated by numerals 6, 7 and 8 are utilized to detect the size of a disk 5 which is to be played. The sensors are aligned along a common radius of disk 5. A CD is approximately 5 inches (12 cm) in diameter, while the diameter of a LD video disk is approximately 8 inches and that of an LDD video disk is approximately 12 inches. Output signals which are output from the three sensors 6, 7 and 8 as a result of a sensing operation are shaped by a waveform shaping circuit 9, and the resultant signals are applied to a disk discrimination circuit 10. The sensors can be of optical type, however the present invention is not limited to the use of optical sensors.

Figure 1:
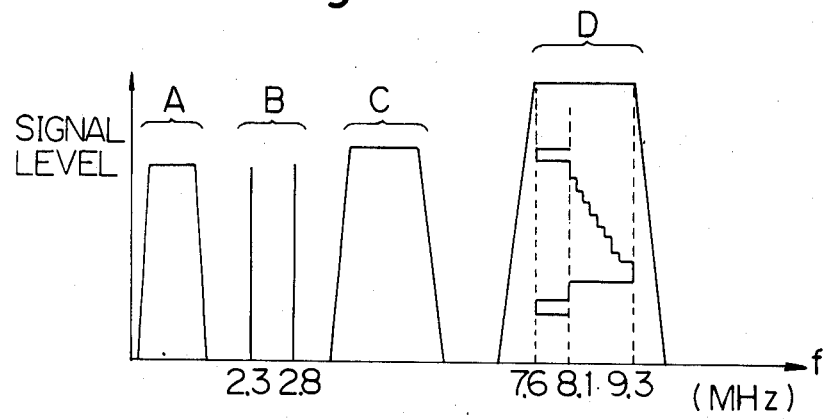
FIG. 1 shows the frequency spectrum of a RF playback signal from a recording disk having recorded thereon a signal formed by frequency modulation of a carrier signal by video and audio signals with a pulse train signal comprising a digitized PCM encoded audio signal superimposed thereon.
Figure 3:
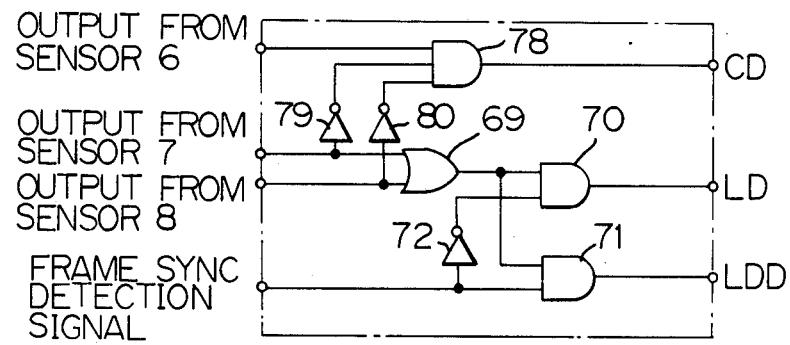
FIG. 3 is a circuit diagram of a disk discrimination circuit used in the recording disk data playback apparatus of FIG. 2.

The disk discrimination circuit 10 serves to judge what type of disk is to be played, i.e. discriminates between CD, LD and LDD disks respectively. This judgement is based on the output signals produced by sensors 6, 7 and 8. FIG. 3 shows a specific example of disk discrimination circuit 10. Since the minimum size of a CD is specified as 12 cm, the output sensing signal from sensor 6 (which is disposed at the outermost peripheral position) is applied, together with the inverted forms of the output signals from sensors 7 and 8 (i.e. produced by inverting the sensor output signals in inverters 79 and 80 respectively), to the three inputs of AND gate 78. When a high logic level output signal is produced from AND gate 78, then this indicates that a CD disk is to be played, i.e. such an output signal constitutes CD decision data. That is to say, if sensor 6 is set in the ON state while the other sensors 7 and 8 are in the OFF state, then this condition is adjudged to indicate that a CD is to be played. In the case of a video disk being played, both 8 inch and 12 inch disk sizes are possible, and hence the output signals from sensors 7 and 8 are applied to the inputs of an OR gate 69, whose output signal is applied to one input of each of AND gates 70 and 71 respectively. In addition, a frame sync signal which is generated by a frame sync detection circuit (described hereinafter) is applied to the remaining input of AND gate 70. Thus, when a sensing output signal is produced by sensor 7 or sensor 8 while a frame sync detection signal is being applied, then a high logic level signal indicating that a LDD is to be played, i.e. LDD decision data, will be output from AND gate 70. If on the other hand no frame sync detection signal is being input at this time, then a high level output signal indicating that a LD is to be played, i.e. LD decision data, will be output from AND gate 70. These decision data are used to drive an indicator 11, which indicates the type of disk that is to be played, and are applied as switching signals to control various switches, as described in the following.

Numeral 12 denotes a pick-up, which reads out recorded data from disk 5. Pick-up 12 is supported by a slider base (not shown in the drawings) such as to be movable along a radial direction of disk 5. This slider base is driven by a drive mechanism (not shown in the drawings) which comprises a slider motor, reduction gears, etc. The playback data from recording disk 5, read out by pick-up 12, is input to an RF amplifier 13, whose output is applied to a digital data demodulator system 14, to an analog audio demodulator system 15, and to a video demodulator system 16 respectively. RF amplifier 13 covers a wide range of frequencies, e.g. extending from approximately 5 KHz to 14 MHz. In this way, a single amplifier serves to amplify the playback PCM audio signal, the playback FM audio signal and the playback FM video signal.

Digital data demodulator system 14 incorporates a changeover switch 17 which is controlled by the decision data outputs described above, in accordance with whether playback digital data form a CD or from a LDD is to be input to demodulator system 14. When a LDD is to be played, changeover switch 17 is set to the "a" position in response to the LDD decision data from disk discrimination circuit 10, while when a CD is to be played, then changeover switch 17 is set to the "b" position thereof. In the case of CD playback, the playback RF output signal contains only PCM audio data, and this is subjected to MTF (modulation transfer function) correction, i.e. high-frequency range compensation, by means of equalizer 18.

On the other hand, when an LDD is to be played, the playback RF signal includes both FM audio data and FM video data, together with the digitized audio data. In this case therefore, the RF signal input to demodulator system 14 is input to a LPF (low-pass filter) 19, whose output is applied to a de-emphasis circuit 20. The PCM audio data will usually be encoded in the form of an EFM signal. During recording, this digital signal is directly superimposed on a FM modulated video signal as described hereinabove, so that the low frequency components of the digital signal may be distorted by the effects of the low-frequency components of the FM video signal. For this reason, the low-frequency components of the digital audio signal are boosted prior to recording, and during playback, the boosted low frequency components of the audio signal are restored to the correct level by a de-emphasis circuit 20. This provides an improved signal/noise ratio of the reproduced digital audio signal, with respect to noise in the low frequency region resulting from the recording/playback process.

In the present embodiment, switching of the signal processing system is carried out by using changeover switch 17. However it should be noted that it is equally possible to achieve this result by switching the power supplies of circuits within digital data demodulator system 14 on or off, as appropriate.

The playback EFM signal, transferred through changeover switch 17, is applied through frame sync detection circuit 21 to EFM demodulator circuit 22, and also to the playback clock signal generating circuit 23. The playback clock signal which is thus produced by circuit 23 is input to EFM demodulator circuit 22 to perform demodulation of the PCM digital signal. The data contained in the resultant demodulated signal from demodulator circuit 22 is written into a RAM (random access memory) 24, under the control of a memory controller 25. This data write-in process is performed in synchronism with a write-in clock signal which is produced as a frequency-divided output signal from playback clock signal frequency divider 26.

Subsequent read-out of the data which has thus been stored in memory 24 is carried out in synchronism with a read-out clock signal which is produced by frequency division of the oscillator output signal from VCO (voltage controlled oscillator) 27 of a PLL (phase lock loop), in frequency divider 20. This PLL circuit is formed of VCO 27, referred to above, and a phase comparator (P/C) 31 which receives as input signals a signal produced by frequency division of the playback clock signal (performed in frequency divider 29) and a signal which is produced by frequency division of the oscillator output signal from VCO 27 (performed in frequency divider 30). The PLL circuit also includes a LPF (low-pass filter) 32, which receives the output signal from phase comparator 31, and a changeover switch 33. Changeover switch 33 enables selection of either the output signal voltage from LPF 32 or a reference voltage $V_{ref1}$ to be input to VCO 27 as a bias control voltage (which controls the frequency of oscillation of VCO 27).

During playback of a LDD, changeover switch 33 of the PLL circuit is set to the "a" contact position, to apply the output voltage from LPF 32 to VCO 27, while when a CD is to be played, changeover switch 33 is set to the "b" contact position, to apply the reference voltage $V_{ref1}$ to VCO 27. The operation of changeover switch 27 to perform this voltage selection process is controlled in accordance with the decision data output from disk discrimination circuit 10 described above. In this way, when a LDD is being played, the read-out clock signal which is used to read out stored data from memory 24 is synchronized in phase with the playback clock signal, while when a CD is being played, a loop switch 59 (described in the following) is closed, whereby the output signal from phase comparator 31 is transferred through LPF circuit 77 to drive the spindle motor 2. In this case, the playback clock signal becomes synchronized in phase with the fixed-frequency clock signal that is produced by VCO 27 when the fixed bias voltage $V_{ref1}$ is input to VCO 27 as described hereinabove.

The digital signal which is thus read out from memory 24 is converted to an analog audio signal by a D/A (digital-to-analog) converter 34, and this analog output signal is transferred through a LPF 35L and LPF 35R to the left and right-channel playback audio output terminals denoted as DL and DR.

Memory controller 25 monitors the state of usage of the contents of memory 24. When overflow of memory 24 occurs, or when the memory becomes empty (i.e. no data stored therein), then data indicating these respective conditions are supplied to a voltage generator 36 by controller 25. During LDD playback operation, in accordance with the data indicating the usage status of memory 24 supplied to voltage generator 36 by memory controller 25, voltage generator 36 produces a positive control voltage in the event that overflow of memory 24 has occurred, and produces a negative voltage in the event that an empty state of memory 24 has occurred. These control voltages are superimposed on the output voltage from LPF 32, and hence are applied through changeover switch 33 to VCO 27. In this way, the control voltages control the frequency of the read-out clock signal.

Thus, data stored in memory 24 are continuously monitored, and when the processing capability and storage capacity of memory 24 are exceeded or are under-utilized, a positive or negative control voltage is generated which, in effect, commands counter-acting operation by the PLL circuit. In this way, a normal usage status of memory 24 is continuously maintained.

Analog audio demodulator system 15 will now be described. 37L and 37R are BPFs (band-pass filters) which pass only the 2.3 MHz and 2.8 MHz audio carrier components of the playback RF signal. The output signals from BPFs 37L, 37R are FM-demodulated by FM demodulators 38L, 38R respectively, and the resultant outputs are transferred through de-emphasis circuits 39L, 39R respectively to the left and right playback audio channel output terminals denoted as 73L and 73R respectively.

Video demodulator system 16 will now be described. The video data is extracted from the playback RF signal by means of a BPF and notch filter circuit 40. These filters are designed to have sufficiently sharp cut-off characteristics to exclude the EFM digital audio component and the 2.8 MHz and 2.3 MHz audio carrier components of the playback FM signal which is produced during LDD playback. The video data thus derived is transferred through a limiter circuit 41, whose output signal is input to an FM demodulator 42. The resultant demodulated output signal from demodulator 42 is passed through a LPF 43 to a drop-out compensator 44, which performs drop-out compensation on the demodulated signal. In this embodiment, drop-out compensator 44 consists of a drop-out sensor (DOS) 46 to which the playback RF signal is transferred through an HPF (high-pass filter) 45, an analog switch which is set in the open state in response to a drop-out sensing signal produced by DOS 46, and a hold capacitor which is connected between one output terminal of this analog switch and a reference voltage. When drop-out occurs, the level of the output signal from LPF 43 prior to the drop-out sensing output being produced by drop-out sensor 46 is stored in the hold capacitor, and is applied to the succeeding circuit stage, to thereby produce drop-out compensation. The output signal from drop-out compensator 44 constitutes the video output signal.

The output signal from drop-out compensator 44 is input to a horizontal sync separator circuit 47, which performs separation of the horizontal sync signal. The horizontal sync signal thus derived is supplied to phase comparators 48 and 49, whereby any phase difference between the horizontal sync signal and a reference signal produced by reference frequency signal generating circuit 50 is detected. The output signal from phase comparator 48 is applied as one of the input signals of an addition circuit 51, while the output signal from phase comparator 49 is transferred through an equalizer amplifier 52 to the other input of addition circuit 51. The output signal from addition circuit 51 is transferred through an equalizer amplifier 53 and driver 54 to drive spindle motor 1, which serves to rotate LDDs and LDs as described hereinabove. The above components constitute the spindle servo system. In addition, the output from equalizer 52 is applied through a loop switch 55, changeover switch 56 and driver 57 to drive an actuator (not shown in the drawings), which is integral with pick-up 12. As a result of driving this actuator, the light spot which is employed for data read-out is deflected along a direction which is tangential to a disk track. This system constitutes a tangential servo loop. The actuator can consist of a tangential mirror which is rotated such as to deflect the data read-out light spot along a direction tangential to the recording track. Alternatively, the light spot can be moved tangentially with respect to a track by displacing a lens, which serves to focus the light spot onto the recording disk surface, in a direction at right angles to the optical axis of the lens.

Loop switch 55 is is closed in response to a spindle lock signal which is output from a spindle lock sensing circuit 58, when lock is achieved by the spindle servo system. More specifically, when playback begins, then firstly the spindle motor 1 is driven in response to the output signal from phase comparator 48, and coarse adjustment of the speed of rotation of spindle motor 1 is performed by the spindle servo loop. When, as a result of this, the lock condition is achieved by the spindle servo loop, loop switch 55 is set in the ON state and the actuator is driven by the output signal from phase comparator 49 such that fine adjustment with respect to the time axis (i.e. by the tangential servo system) is initiated. As a result of this configuration, jitter components which cannot be eliminated due to the action of the spindle servo system alone are effectively eliminated by the action of the tangential servo system.

However, some residual high frequency jitter components will remain uncorrected by the action of the tangential servo system. This is due to the fact that the mechanical system of the actuator drive assembly cannot respond with sufficient accuracy to entirely eliminate all jitter. However this problem is overcome by arranging that the cut-off frequency of LPF 32 in the PLL circuit which produces the read-out clock signal in digital data demodulation system 14 is made lower than the loop bandwidth of the tangential servo loop. This results in complete elimination of the residual jitter components. Also, preferably, the cut-off frequency of LPF 32 should be set lower than the wobble frequency of the recording disk, i.e. the frequency of jitter due to eccentric rotation of the recording disk (which is in the range 8 to 30 Hz in the case of an LDD). If this is done, then jitter caused by eccentricity of the disk will be completely eliminated.

In the present embodiment, the operation of the spindle servo system and the tangential servo system are based on the horizontal sync signal. However it is equally possible to base the operation of these servo systems on the 3.5 MHz color information component contained in the playback FM video signal.

The servo systems used in playback of LD and LDD video disks have been described in the above. When a CD is to be played, a spindle servo system based on phase comparator 31 and digital data demodulator system 14 (described hereinabove) is set in operation. Specifically, during CD playback, loop switch 59 is closed, and the output signal from phase comparator 31 is transferred through switch 59 and driver 60 to drive spindle motor 2, which performs CD rotation. With prior art types of disk player, the tangential servo system described in the above is not utilized during playback of a CD. However, spindle motor 2 cannot respond with sufficient rapididity to follow (and hence compensate) the high frequency components of the output signal from phase comparator 31, i.e. the time axis error signal. In this embodiment of the present invention, therefore, the HF components of the time axis error signal (which is output from HPF 61) are transferred through changeover switch 56 and driver 57, which are within a servo loop that drives the actuator of pick-up 12. Thus, the tangential servo system is utilized in this case. The changeover switch 56 is set to the "a" contact position during playback of a LD or LDD, in response to the decision data produced by disk discrimination circuit 10, while switch 56 is set to the "b" contact position during playback of a CD.

The operation of the tangential servo system in the case of CD playback is based upon a signal which is produced by frequency division of the playback clock signal derived by playback clock extraction circuit 23, with the present embodiment. However it should be noted that it is equally possible to control the tangential servo loop in the basis of a signal which is produced by frequency dividing the frame sync signal that is output from frame sync detection circuit 21, since the frame sync signal and the playback clock signal are mutually synchronized.

The output signal from spindle lock sensing circuit 58 is inverted by inverter 62, and the inverted signal is applied as a "spindle unlock" signal (which indicates that the spindle servo loop is not in the locked state) to one input of OR gate 63. A random access data signal is applied to the other input of OR gate 63. This signal is generated during a random access command, e.g. a scan, search, jump, command etc. The LDD decision data from disk discrimination circuit 10 is also input to OR gate 63. The output signal from OR gate 63 is transferred through control command circuit 64, and the output signal from circuit 64 is applied to playback clock extraction circuit 23.

Figure 4:
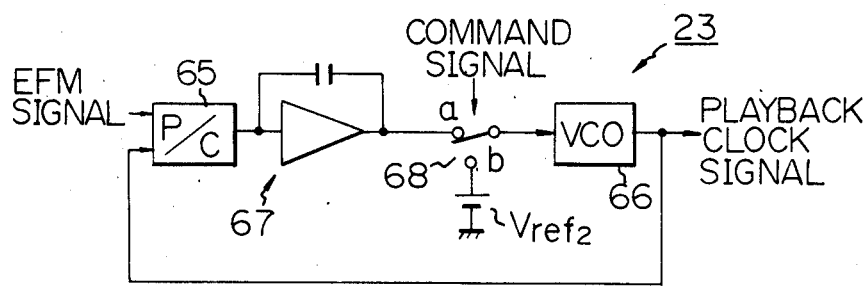
FIG. 4 is a block circuit diagram of a playback clock extraction circuit used in the recording disk data playback apparatus of FIG. 2.

FIG. 4 shows an embodiment of the playback clock extraction circuit 23. In this circuit, a phase comparator 65 serves to detect a phase difference between the playback EFM signal and the oscillator output signal from VCO (voltage controlled oscillator) 66. The resultant phase difference signal from phase comparator 65 is inverted, and the inverted signal is transferred through LPF 67 and changeover switch 68, to be input to VCO 66. This circuit configuration constitutes a PLL circuit, for generating the playback clock signal.

When changeover switch 68 is at the "a" contact position, which is the normal position of this switch, the output signal from LPF 67 is applied to VCO 66. However, as described in the above, when a command signal is output from control command circuit 64, then switch 68 is set to the "b" contact position in response to that command signal, whereby a predetermined reference voltage $V_{ref2}$ is applied to VCO 66. In this way, when the spindle servo system is not in the locked state, or while a scan, search, jump or other random access command is in progress (so that the data read-out light spot is jumping across the recording tracks), the reference voltage $V_{ref2}$ is applied to VCO 66. As a result, the frequency of oscillation of VCO 66 is held fixed at a value which is close to the playback clock frequency. Thus, when the spindle servo system subsequently enters the locked condition, or after the random access command has been cancelled, phase lock-in of the playback clock can be rapidly accomplished.

As described hereinabove, a pair of output terminals 73L and 73R are provided for the analog audio left and right channel signals respectively. In addition, a pair of output terminals 74L and 74R are provided, from which either the analog audio left and right channel signals or, (during playback of a CD or LDD) the digital audio left and right channel signals can be respectively output. The selection of either the digital or the analog audio channel signals to be output from terminals 74L, 74R is performed by switch 75, which in this embodiment is a relay which is controlled by the CD and LDD decision data output from disk discrimination circuit 10. Such an arrangement makes it possible to use a single pair of loudspeakers, fixedly connected to output terminals 74L, 74R, to reproduce analog audio signals when a LD is being played, and digital audio signals when a CD or LDD is being played. Since the control signals CD, LDD are generated automatically when it is detected that a CD or LDD is to be played, there is no need for the user to perform any manual operations.

Referring again to FIG. 2, output terminals 73L and 73R are coupled to receive the audio output signals from analog audio demodulator section 14. During playback of a LD, the latter audio outputs are supplied through changeover switch 75 to output terminals 74L and 74R. During playback of a LD, changeover switch 75 is set to the "a" contact position, which is the normal status of this switch. During playback of a LDD or CD, changeover switch 75 is set to the "b" contact position in response to the disk decision data produced by disk discrimination circuit 10. The left and right channels of the audio output from digital data demodulator system 14 are transferred through mode changeover switches 76L, 76R, and changeover switches 75L, 75R, to output terminals 74L and 74R respectively.

Thus, during LD playback, an audio signal derived by demodulation of an analog (i.e. frequency modulation) type of recorded signal will be output both from terminals 73L, 73R, and from output terminals 74L, 74R. During LDD or CD playback, audio signals derived from a digitally recorded signal (and hence of substantially higher quality than that produced from an analog recorded signal) will appear on output terminals 74L, 74R. Furthermore, during LDD playback, normal quality audio signals (derived from an analog type of recorded signal) will also be produced on output terminals 73L and 73R.

In the embodiment of FIG. 2, switches 76L, 76R respectively consist of relays which operate mutually independently. In a conventional type of switching apparatus to perform the switching functions described above, signal switching is performed by using one movable contact and two fixed contacts for each signal which is to be switched. With the present embodiment, however, a relay having one additional movable contact and two addition fixed contacts is used. The operation will be described for the case of relay 76L, which switches the L channel digitally-derived output audio signal. This relay is made up of a pair of mutually linked movable contacts $S_{11}, S_{21}$ and two pairs of fixed contacts $S_{12}, S_{13}$ and $S_{22}, S_{23}$, with a contact gap being defined between each of these pairs of fixed contacts. One pair of fixed contacts is provided for each of the movable contacts. The two fixed contacts $S_{12}, S_{23}$ which are most widely separated from one another, i.e. which are separated by the maximum number of contact gaps, disposed in series, are used as input terminals to which the two input signals (i.e. the left and right channel digitally-derived audio signals) are applied. That is to say, one audio channel signal is applied to fixed contact S12 directly, while the other audio channel signal is applied through contacts of the other relay (76R) to fixed contact S23. One of the movable contacts, $S_{11}$, serves as the output terminal. In this way, since two contact gaps are disposed in series between the left channel and right channel signal lines, crosstalk between the right and left channel signals will be effectively suppressed. By increasing the number of contacts, to provide a greater number of contact gaps, an even higher degree of crosstalk suppression can be achieved.

Although not shown in the drawings, a focus servo system is provided, to control the position of pick-up 12 with respect to movement in a direction perpendicular to the plane of a recording disk 5. In addition, a tracking servo system is of course provided, to control the position of pick-up 12 with respect to movement in a radial direction with respect to the disk. It is preferable to execute switching of the signal processing systems for the error signals of the latter servo systems in accordance with whether playback of a video disk (LD or LDD) or digital audio disk (CD) is to be performed. This will enable satisfactory servo loop operation to be attained irrespective of the type of disk which is to be played. It should be noted that in addition to audio data, digital signals which are recorded on CDs or LDDs can consist of digitized image data, computer control data, etc.

As described hereinabove, with a recording disk data playback apparatus according to the present invention, the cut-off frequency of a loop filter which is connected within the phase-lock loop circuit used for read-out clock signal generation is made lower than the maximum frequency of the bandwidth of the tangential servo loop, whereby high-frequency jitter components to which the tangential servo loop cannot respond can be eliminated. The jitter components contained in the playback digital signal are thereby effectively suppressed, and a read-out clock signal can be obtained which is synchronized in phase with the playback digital signal. In this way, digital audio signal demodulation can be executed with freedom from jitter.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. In a recording disk playback apparatus capable of playback fo a recording disk having recorded thereon a video signal which may be accompanied by an audio signal which has been converted into a frequency modulated signal, and a digital signal superimposed on said frequency modulated signal, the improvement comprising:

pick-up means for producing a playback digital signal from said recording disk;
   demodulator means for demodulating said playback digital signal;
   memory means;
   write-in means for writing said demodulated output from said demodulator means into said memory means in synchronization with a playback clock signal which is contained in said playback digital signal;
   servo loop means for implementing position control of a read-out point across a surface of said recording disk along a direction which is tangential to a recording track on a recording disk to be played back; and
   a read-out clock signal generating circuit for generating a read-out clock signal in synchronism with said playback clock signal, said read-out clock signal being utilized to read out data stored in said memory, said read-out clock signal generating circuit comprising a phase lock loop circuit for controlling the frequency of said read-out clock signal, said phase-lock loop circuit including a loop filter for bandwidth limitation connected therein, with the cut-off frequency of said loop filter being selected to be lower than the maximum frequency of the bandwidth of said servo loop.

2. A recording disk data playback apparatus according to claim 1, and further in which said cut-off frequency of said loop filter of said phase-lock loop circuit is selected to be lower than an eccentric wobble frequency component of said playback signal resulting from eccentricity of rotation of a recording disk mounted on said apparatus.

* * * * *